US008194191B2

(12) United States Patent
VanDuyn et al.

(10) Patent No.: US 8,194,191 B2
(45) Date of Patent: Jun. 5, 2012

(54) GRAPHICALLY BASED PROGRAMMING FOR CONTROL DEVICES

(75) Inventors: Luke VanDuyn, Highlands Ranch, CO (US); Neil Marten, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 660 days.

(21) Appl. No.: 12/371,416

(22) Filed: Feb. 13, 2009

(65) Prior Publication Data

US 2010/0208145 A1    Aug. 19, 2010

(51) Int. Cl.
*H04N 5/44* (2006.01)
*H04L 17/02* (2006.01)
(52) U.S. Cl. ............... 348/734; 340/825.69; 340/825.72
(58) Field of Classification Search .............. 348/734, 348/725, 552, 553; 340/825.22, 825.69, 340/825.72, 925.24
See application file for complete search history.

(56) References Cited

U.S. PATENT DOCUMENTS

| | | | | |
|---|---|---|---|---|
| 6,104,334 | A * | 8/2000 | Allport | 341/175 |
| 6,650,248 | B1 * | 11/2003 | O'Donnell et al. | 340/12.28 |
| 6,879,351 | B1 * | 4/2005 | Brown | 348/734 |
| 6,882,299 | B1 * | 4/2005 | Allport | 341/176 |
| 6,909,378 | B1 * | 6/2005 | Lambrechts et al. | 340/4.32 |
| 7,324,168 | B2 * | 1/2008 | Griesau et al. | 348/734 |
| 7,656,464 | B2 * | 2/2010 | Pfiffer | 348/734 |
| 2001/0011940 | A1 * | 8/2001 | Williams et al. | 340/3.9 |
| 2002/0044226 | A1 * | 4/2002 | Risi | 348/734 |
| 2002/0140569 | A1 * | 10/2002 | van Ee et al. | 340/825.69 |
| 2004/0066308 | A1 * | 4/2004 | Sampsell | 340/825.69 |
| 2007/0130607 | A1 * | 6/2007 | Thissen et al. | 725/132 |
| 2007/0176787 | A1 | 8/2007 | Iten et al. | |
| 2008/0231762 | A1 * | 9/2008 | Hardacker et al. | 348/734 |
| 2009/0244402 | A1 * | 10/2009 | Rye et al. | 348/734 |

FOREIGN PATENT DOCUMENTS

| | | |
|---|---|---|
| WO | WO 01/39150 | 5/2001 |
| WO | WO 01/47130 | 6/2001 |
| WO | WO 01/54292 | 7/2001 |

OTHER PUBLICATIONS

International Search Report dated Jun. 7, 2010, PCT/US2010/023661 (WO 10/093640), 3 pages.

* cited by examiner

*Primary Examiner* — Paulos Natnael
(74) *Attorney, Agent, or Firm* — Ingrassia Fisher & Lorenz, P.C.

(57) ABSTRACT

A method for programming a control device. The method for programming the control device may include using a graphical programming interface. The graphical programming interface may direct a user through the programming process with text and graphics. The graphical programming interface may provide a control device image that corresponds to the physical control device that is being programmed. The graphical programming interface may graphically verify to a user whether a button was successfully programmed. Additionally, the graphical programming interface may illustrate the correct positioning of one control device to another control device while programming.

15 Claims, 10 Drawing Sheets

GRAPHICALLY BASED PROGRAMMING FOR CONTROL DEVICES

BACKGROUND

1. Technical Field

The present invention generally relates to control devices and, more specifically, to managing and configuring control devices such as remote controls for electronic devices.

2. Background Discussion

Many households include multiple electronic components such as televisions, digital video recorders ("DVRs"), television receivers such as satellite or cable television receivers, audio systems such as stereo systems, surround-sound systems and so on, digital video disc ("DVD") players, security systems and so on that may be controlled by corresponding remote controls. For example, a television may have a corresponding remote control, an audio system may have a second remote control, and a television receiver may be controlled by yet another remote control. Accordingly, the user may have to program three remote controls in order to watch a movie on a television using a television receiver and a sound system.

However, certain remote controls may be programmed to control one or multiple components. Various buttons of the remote may be programmed to control various devices or perform various functions. Thus, one button on the universal remote control may correspond to and provide certain functions for multiple associated devices. The burden may then be on the user to remember which button on the remote control is associated with which device and which function. Furthermore, each additional remote control may require the user to re-program each of the buttons of a new remote control to access each of the components the user desires to control. Accordingly, there is a need in the art for the management and programming of control devices.

SUMMARY

One embodiment of the present invention may take the form of a method for programming a control device. A television receiver may receive a control command from a remote control and may operate in a programming mode upon receipt of the control command. The television receiver may provide programming information with text and images via a graphical programming interface after receipt of the control command and may receive an indication from the remote control that identifies a selected button for programming. The television receiver may then display the selected button on a remote control image via the graphical programming interface and also may determine whether the selected button is successfully programmed. The television may then indicate on the graphical programming interface whether the selected button is successfully programmed.

Continuing the description of this embodiment, the television receiver may provide programming information with text and images and may allow the user to view the programmed functionality of each of the remote control buttons. The television receiver may determine whether the selected button is successfully programmed by receiving a positive acknowledge command from the remote control. Furthermore, the method of programming the control device may also include storing the programming of each of the remote control buttons on the television receiver.

Another embodiment of the present invention may take the form of a system for programming a first control device. A video display may be operable to display a graphical programming interface and the first control device may be operable to receive programming functionality to program a control device button and may be in communication with at least a television receiver. The first control device may include at least a transmitter operable to transmit commands at least to the television receiver. The television receiver may be operable to provide display information to the video display for displaying the graphical programming interface and may also be operable to verify the successful programming of a control device button. The television receiver may also include at least a receiver operable to receive commands at least from the first control device.

Continuing the description of this embodiment, the graphical programming interface may be operable to provide programming information with text and images. Also, the graphical programming interface may be further operable to graphically indicate that the first control device button was successfully programmed with text and may provide an image of the first control device button. Furthermore, the graphical programming interface may be further operable to graphically indicate the positioning of the first control device with a second control device when transmitting information between the control devices. Additionally, the television receiver may be further operable to receive a positive acknowledge from the first control device when the first control device successfully receives programming functionality from the second control device.

DETAILED DESCRIPTION OF EMBODIMENTS

Figure 1:
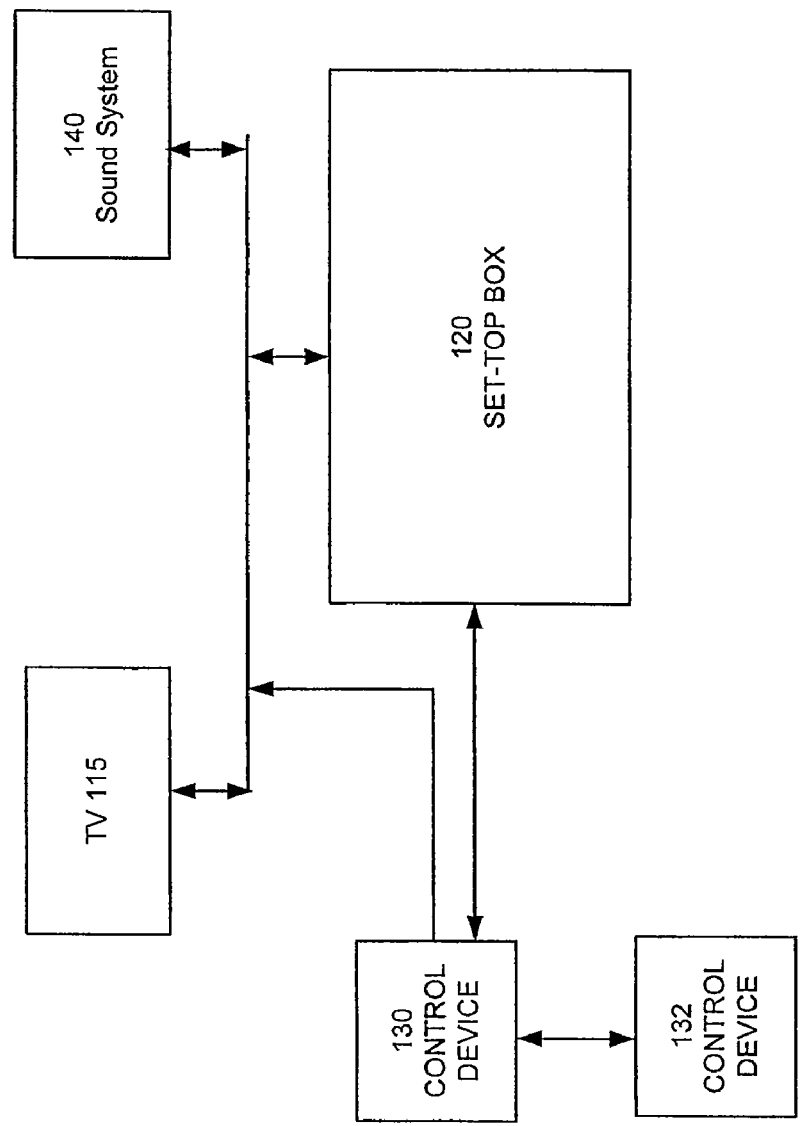
FIG. 1 depicts a sample operating environment for managing a control device.

Generally, one embodiment of the present invention may take the form of a method for programming a control device. In this embodiment, a graphical programming interface may provide text and/or graphical information to a user regarding the programming of a control device. For example, the graphical programming interface may indicate to a user, via text and graphical displays on a screen, whether the control device is currently programmed, which of the buttons on the control device are currently programmed, whether the user successfully programmed a selected button and so on. Generally, the graphical programming interface may be displayed on a video display, such as a television screen, and may include images of the control device currently being programmed. Additionally, the graphical programming interface may provide a user with a step-by-step control device programming guide that includes images of the control device. The displayed control device image may illustrate to the user which buttons have been successfully programmed and which buttons have not yet been programmed.

Another embodiment may take the form of a method for managing control device information. In this embodiment, a graphical programming interface may allow a user to access information, such as the programmed functionality associated with the buttons of a control device. The control device information may be accessed via any television receiver connected to the television receiver used to program the control device. In one example, a user may wish to view the functions of the individual buttons of the control device. Continuing this example, the user may access the graphical programming interface via any television receiver, which is in communication with the television receiver used to program the control device. Although the control device may have been programmed using a first television receiver, the functionality of the control device may be viewed using a second television receiver. Further, the second television receiver may be used to program additional functionality into the control device.

It should be noted that embodiments of the present invention may be used in a variety of systems that may include components that may be controlled by a remote device. The embodiment may include or work with a variety of electrical components, communication devices, remote devices and television receivers. Aspects of the present invention may be used with practically any apparatus related to remotely controllable electrical components. Accordingly, embodiments of the present invention may be employed in any type of system where at least some of the components may be controlled by a remote device.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

FIG. 1 depicts an example environment 100 in which a control device 130 may be programmed. Various components may be located in the environment 100 of FIG. 1 such as, but not limited to, a television 115, a television receiver 120, an audio system 140, a first control device 130 and a second control device 132. In one embodiment of FIG. 1, the first control device 130 may be programmed with control commands that may be associated with buttons on the second control device 132. Stated differently, a first button may be selected on the first control device 130 and may be programmed with the same control command as a second button on the second control device 132.

In FIG. 1, information such as control commands for individual components, identifying codes for the individual components, data which allows execution of control functions for individual components and so on, may be stored on the television receiver 120. The information may also be communicated from the television receiver 120 to the individual components of the environment 100. The type of information and the operations for loading the information onto the television receiver 120 will be discussed in further detail below.

A television receiver 120, which generally may be a set-top box 120, may be located in the environment 100 of FIG. 1. The television receiver may be any of various types of devices including a set-top box, a cable receiver and so on. Additionally, the television receiver 120 may include various functionalities, including but not limited to, digital video recorder ("DVR") functionality, infrared ("IR") blaster functionality, wireless transmission (including radio frequency ("RF") blaster functionality) and so on. The television receiver 120 may be connected to and receive signals from a cable television distributor, antenna that can receive broadcast signals from a broadcast television provider, satellite television distributor, control device 130, phone line connection, and one or more peripheral electronic devices that may include a television 115. The television receiver 120 may send and receive commands to and from a control device 130 and the communication between the control device 130 and the television receiver 120 may be via the Internet, intranet, LAN, WAN, WIFI, wireless, coaxial cables, CAT 5 cabling, fiber optic connections and so on.

A control device 130 may operate in the environment 100. The control device 130 may be referred to herein as a "remote control" or a "remote." The control device 130 may communicate with the television receiver 120 through a wired or a wireless connection. The wireless connection may be an IR signal, RF signal, wireless Internet Protocol ("IP") connection, cellular, WiMax, satellite signal, combinations thereof or otherwise. The control device 130 need not be in the line of sight of the television receiver 120 and may be located anywhere that permits communication with the television receiver. The control device 130 may include a touch pad, buttons, dials, or other man-machine interfaces.

In FIG. 1, the television receiver 120 may be operationally, directly, indirectly, functionally or otherwise connected to the television 115. Communications between the television 115 and the television receiver 120 may be unidirectional or bi-directional, where bi-directional communications are provided by the television display, and may be provided through various interfaces such as a high definition multimedia interface ("HDMI") cable, a co-axial cable, structured cable, Ethernet, wirelessly, combinations thereof and so on. The television 115 may receive a signal from the television receiver 120, through the interface, to display the graphical programming interface on the screen so that the user may view the available options provided by the graphical programming interface and interact therewith. The graphical programming interface will be discussed in further detail below.

In FIG. 1, the television receiver 120 may communicate with the television 115 and/or the control device 130 through any type of interface as previously discussed; such communication may be wired or wireless, across a network or direct. Furthermore, the communication between the television receiver 120 and the control device 130 is generally wireless, although it may be possible to communicate between the television receiver and the control device by establishing a wired connection between the two components. Moreover, it may be possible for the television receiver 120 to communicate with the television 115 and the control device 130 through any combination of wired and wireless connections.

In one embodiment, the television receiver may communicate with the control device while the control device is being programmed and the television receiver may monitor the programming of the control device. Continuing this embodiment, the television receiver and/or the control device may receive a command to operate in a programming mode. After the television receiver enters into the programming mode, the television receiver may cause a graphical programming interface to be displayed on a screen. The graphical programming interface may assist a user with programming a control device. The programming mode of the television receiver and the control device as well as the graphical programming interface will be discussed in further detail below. Once the television receiver and the control device are in the programming mode, the television receiver may communicate with and/or monitor the control device to verify, in one example, the success or failure of assigning command functionality to the buttons of the control device. The communication between the television receiver and the control device while operating in the programming mode will be discussed in further detail below.

The control device buttons may be programmed via the television receiver to perform user-selected control functions. For example, a user may wish to program a "channel up" control device button to turn the television volume up instead of changing the channel. The user may program the control device button via the television receiver which may provide images (in addition to text) to direct the user through the programming process. Additionally, the graphical programming interface may visually (e.g., through images and/or text) and/or audibly indicate the success or failure of programming the control device button. Generally, the graphical programming interface may indicate successfully programmed control device buttons in any number of ways including by changing, font size, color, type or, pointing indicators such as arrows, color changes and so on.

Additionally, in one example, the control device 130 may include buttons that allow the user to move a cursor or indicator around the graphical programming interface. Continuing the example, the control device 130 may include up, down, left and right buttons. The four buttons may allow the user to scroll to the desired selection on the graphical programming interface on the screen of the television 115. Thus, if the user would like to go to a selection that may be located beneath a currently selected box on the screen, the user may use the down button to move down to the desired selection. Additionally, the user may use buttons, a touch pad, a track wheel/ball and so on, on a control device, to navigate the graphical programming interface.

The graphical programming interface may direct a user through various programming processes and may be displayed on a video display, such as a television screen and may include an image of the remote control to be programmed. For example, the graphical programming interface may provide direction to a user for transferring all of the functionality of a second remote control to a first remote control, for transferring programming functionality for selected buttons from a second remote control to a first remote control, for swapping the functionality of two or more buttons on a single remote control, for providing the user with information on the functionality of buttons on a remote control and so on. The first and second remote controls may both correspond to television receivers, or the second remote control may correspond to a different component, such as a television, while the first remote control corresponds to the television receiver. The functionality of the graphical programming interface will be discussed in more detail below.

A user may access the graphical programming interface in various ways, such as, but not limited to, selecting a button on the physical remote control, selecting a remote control programming mode from an electronic menu displayed on a screen, or by activating a physical control on the television receiver. Generally, a first device, such as one of the television receiver or the control device, may be placed in the programming mode. The first device may send a command, via a signal, to the second device to place the second device in the programming mode as well.

In one example, the remote control may have a dedicated button for accessing the graphical programming interface. The user may select the dedicated button when the user wishes to program the remote control. The television receiver may receive a control signal from the remote control, which may cause the television receiver to operate in a programming mode. Thus, the remote control may begin operating in the programming mode when the user selects the dedicated button and the television receiver may operate in the programming mode upon receipt of the command from the remote control.

In another example, the remote control may be used to select the programming mode from an electronic menu provided by the television receiver and displayed on a video display. Upon selection, the television receiver may operate in the programming mode and then send a control signal to the remote control to cause the remote control to operate in the programming mode.

Each device may have a set of specific functions associated with the programming mode. For example, the television receiver may monitor the remote control for information such as, but not limited to, a signal indicating a particular remote control button has been chosen for programming, an acknowledge signal from the remote control indicating the remote control received programming information from a second remote control and so on. In another example, when the remote control is operating in the programming mode, the remote control may recognize that a button pressed for a specific amount of time is being selected for programming.

Once the television receiver and remote control are in programming mode, configuration information may be initially requested and used for programming the remote control. The configuration information may correspond to a number of devices including, but not limited to, a television, a remote control, a television receiver, an auxiliary device and so on. The configuration information may include codes for the remote control and/or a corresponding device and may be entered by the user or may be looked up using a database, which may be stored on the television receiver. As one example, a content or transmission provider may provide the database information to the television receiver.

The configuration information may be communicated to the television receiver using any of the previously discussed methods and/or methods known to one skilled in the art. The control functions associated with the remote control buttons may depend on the selected configuration information. For example, the user may select a TV code while in a programming mode. Once selected, the remote control buttons may be programmed with control functions to control the television. In another example, the user may select the television receiver code while in the programming mode, and accordingly, the remote control buttons may be programmed with control functions to control the television receiver.

Figure 2:
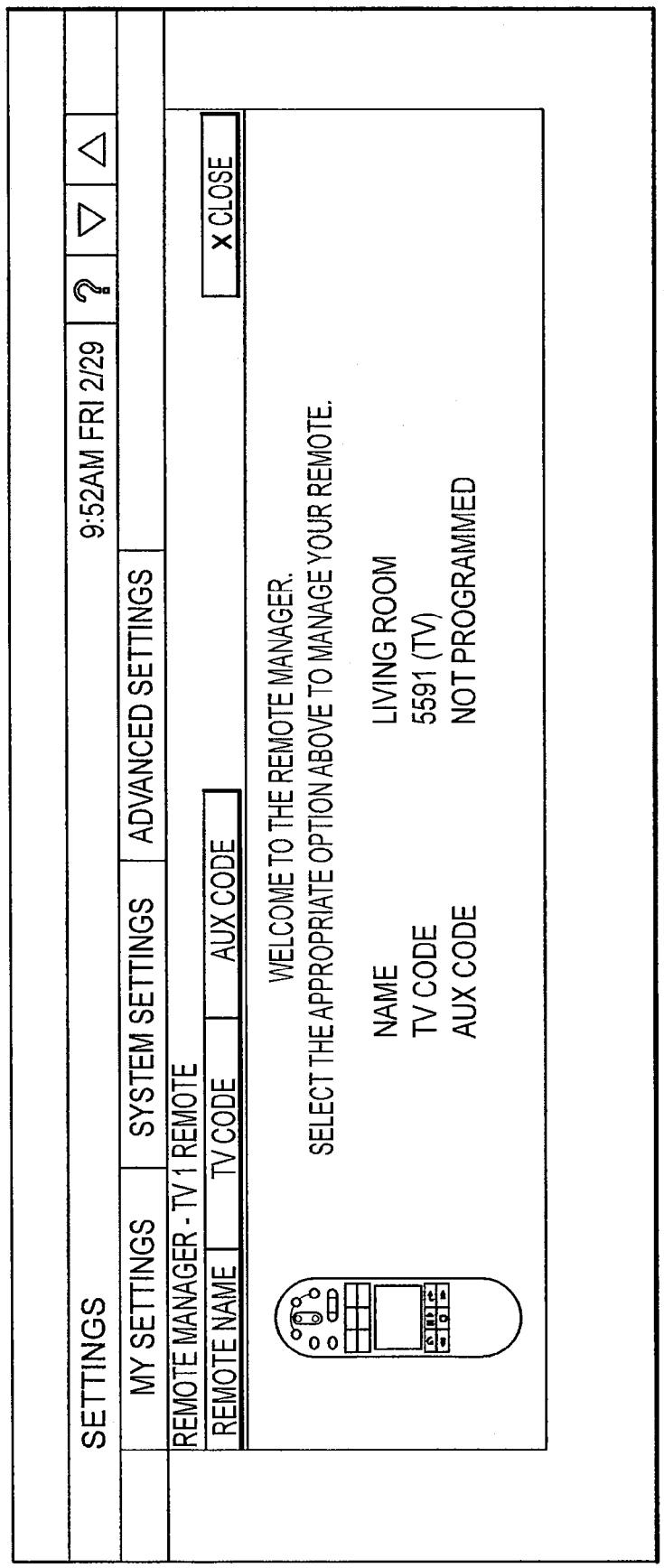
FIG. 2 depicts an example of a graphical programming interface screen for configuring a control device.

In one example and as shown in FIG. 2, the graphical programming interface may allow a user to select from various settings, for example, personal settings, remote control settings, television receiver settings, system settings, advanced settings and so on. The settings may also provide a user with a graphical user interface in addition to text information.

Additionally, FIG. 2 depicts various options the user may select by using the physical remote control. The user may scroll to the desired option using buttons on the remote control or may use the touch pad on the remote control. Although the graphical programming interface of FIG. 2 depicts one particular screen configuration, the arrangement of the options may vary as well as the screen arrangement of the options. For example, an alternative screen display from that of FIG. 2, may locate the setting options vertically along the left portion of the screen with each sub-category displaying to the right of the selected option.

Figure 6:
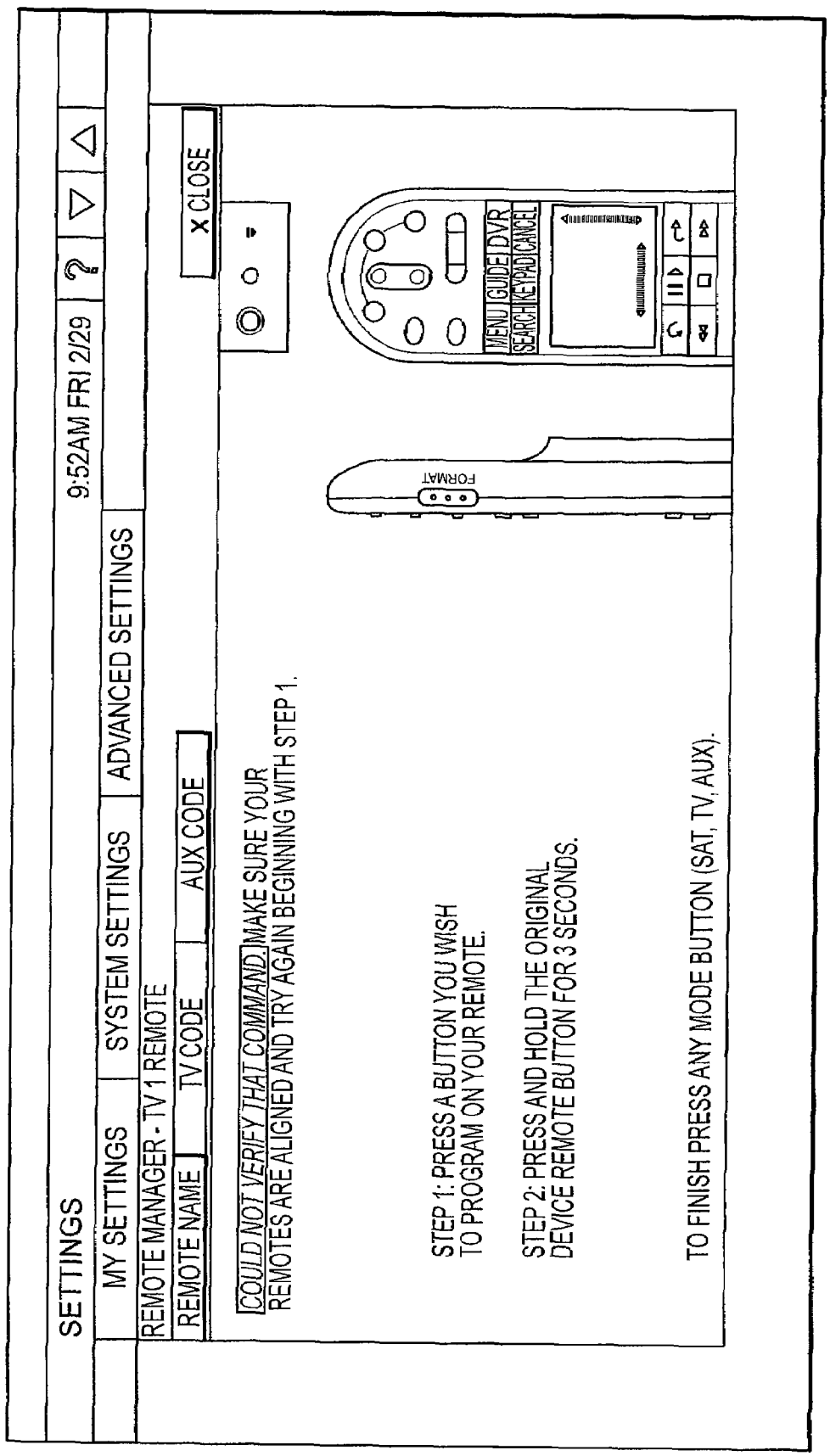
FIG. 6 depicts another example of a graphical programming interface screen.
Figure 7:
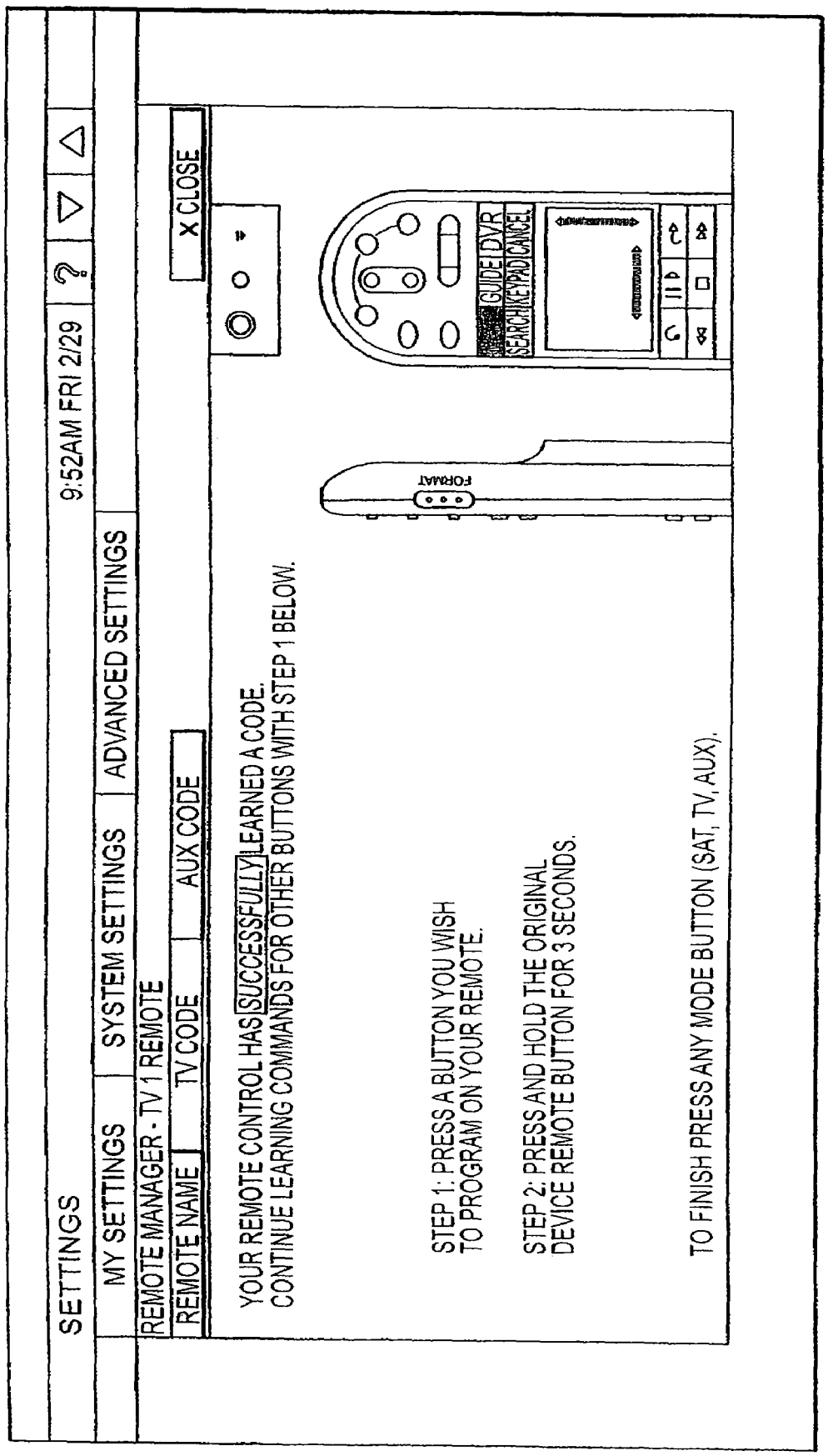
FIG. 7 depicts another example of a graphical programming interface screen.
Figure 8:
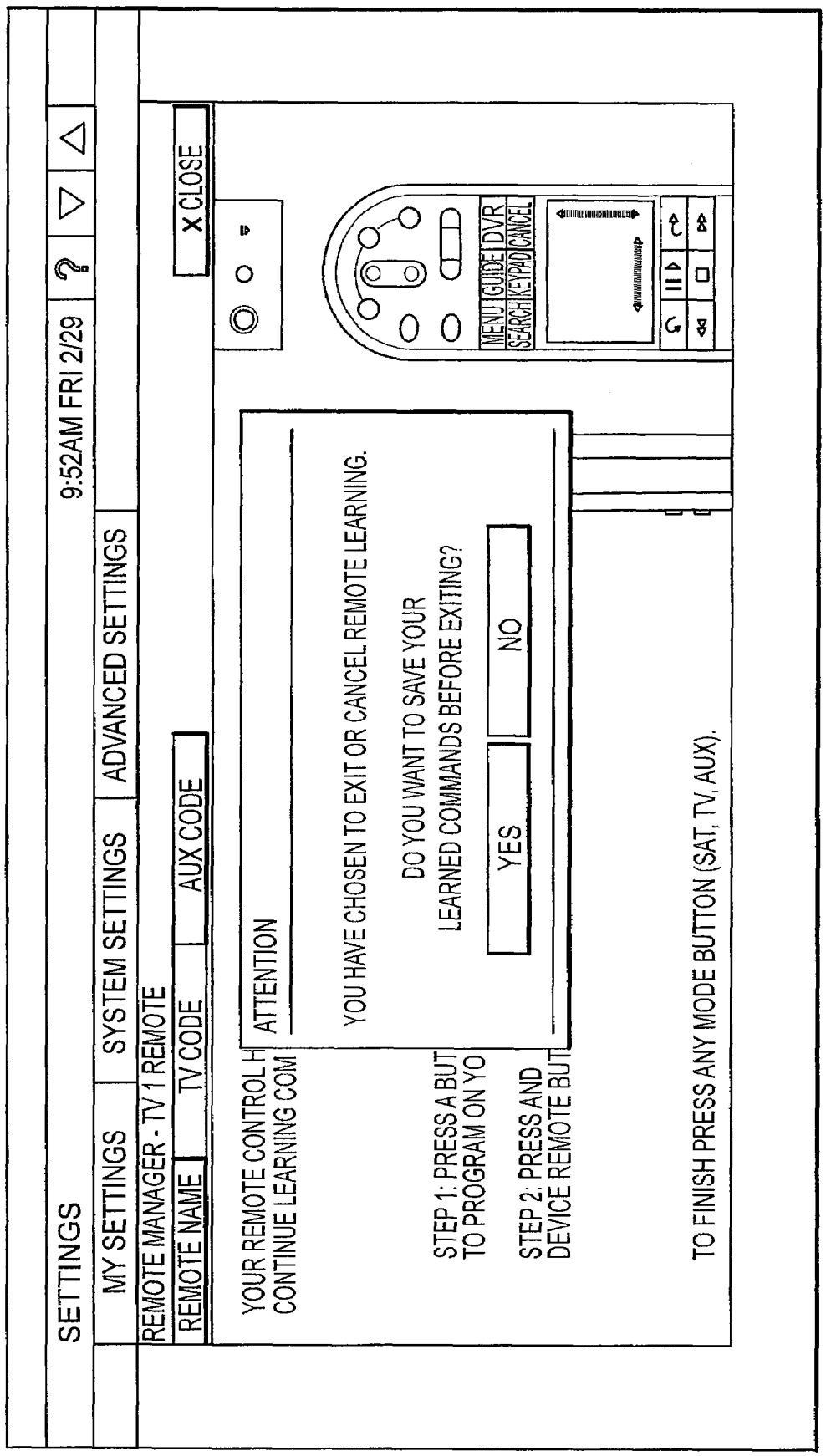
FIG. 8 depicts another example of a graphical programming interface screen.

Further, as generally illustrated in FIGS. 2-8, the graphical programming interface may provide general information and options on every screen, such as the current date and time, a help option (depicted as a question mark), up and down arrows which may allow a user to access previous and subsequent screens of the graphical programming interface and so on. Additionally, as shown in FIGS. 2-8, the user may have the option to exit the programming mode in any given screen. As depicted in FIG. 8, if the user selects the exit option, the graphical programming interface may verify that the user selected the correct option and wishes to exit the programming mode prior to terminating.

In the example of FIG. 2, the graphical programming interface may provide remote control information to the user. As shown in FIG. 2, remote control information may be provided to the user such as, but not limited to, the name of the remote control (which may, in one example, be the location of the device controlled by the remote control). In this example, the name of the remote control is "Living Room." The graphical programming interface may allow the user to descriptively name the remote controls so that the user may better identify the remote control.

In another example, the remote control may have been previously configured by the user, but the user may wish to modify the remote control programming. In this example, the television receiver may communicate with the remote control via wired or wireless signals to ascertain whether the remote control has existing functions previously assigned to the buttons. The television receiver may receive information from the remote control that allows the television receiver to identify the particular remote control selected for reprogramming. The television receiver may access stored information from the television receiver memory, regarding the remote control being programmed and may ascertain that the remote control has previously programmed buttons. The remote control may graphically display to the user which buttons on the remote control have been previously programmed and which have not. For example, the previously programmed buttons or controls may be highlighted or colored one way and the remaining buttons or controls (which have not been previously programmed) may be highlighted or colored in a different way.

In yet another example, the television receiver may store the control functions associated with each programmed button for each programmed remote control. Stated differently, a remote control may be programmed using a television receiver. The television receiver may store the programmed control functions for each button for the remote control. In another example, the programming information for the remote control may be transmitted to any number of television receivers by the programmed remote and stored on the additional television receivers.

Figure 3:
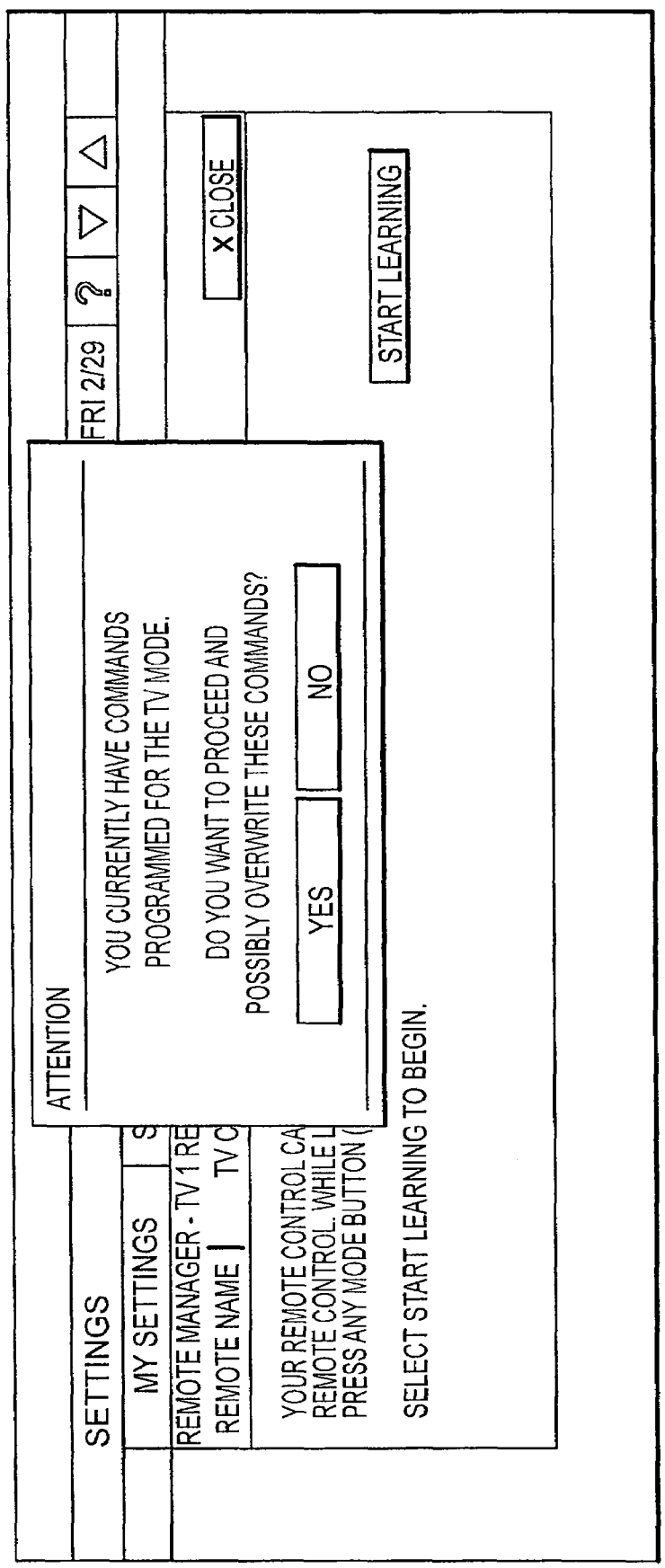
FIG. 3 depicts another example of a graphical programming interface screen.

FIG. 3 depicts an example of a graphical programming interface screen which requests user verification to proceed with remote control programming. As shown in FIG. 3, the television receiver via the graphical programming interface may also verify whether the remote control has been previously programmed. The graphical programming interface may also verify that the user wishes to proceed and possibly overwrite the existing commands by displaying a window as shown in FIG. 3. The user may verify whether they would like to proceed by selecting the appropriate button in the displayed window. Continuing this example, the user may proceed to overwrite the existing programming of programmed buttons on the remote control, however, the user need not overwrite all the existing programming. Instead, the user may choose not to program buttons that have existing functionality associated with them and assign functionality to the buttons that have not been previously programmed.

In another example, the graphical programming interface may verify that the user wishes to overwrite existing programming for each previously programmed button. In this example, the television receiver may receive an indication that a button has been selected for programming from the remote control. The television receiver may verify the programming associated with the remote control by using the remote control programming information in the television receiver memory and specifically, the programming associated with the selected button. The television receiver may verify the programming by accessing a stored database, which includes information for various programmed remote controls.

Figure 4:
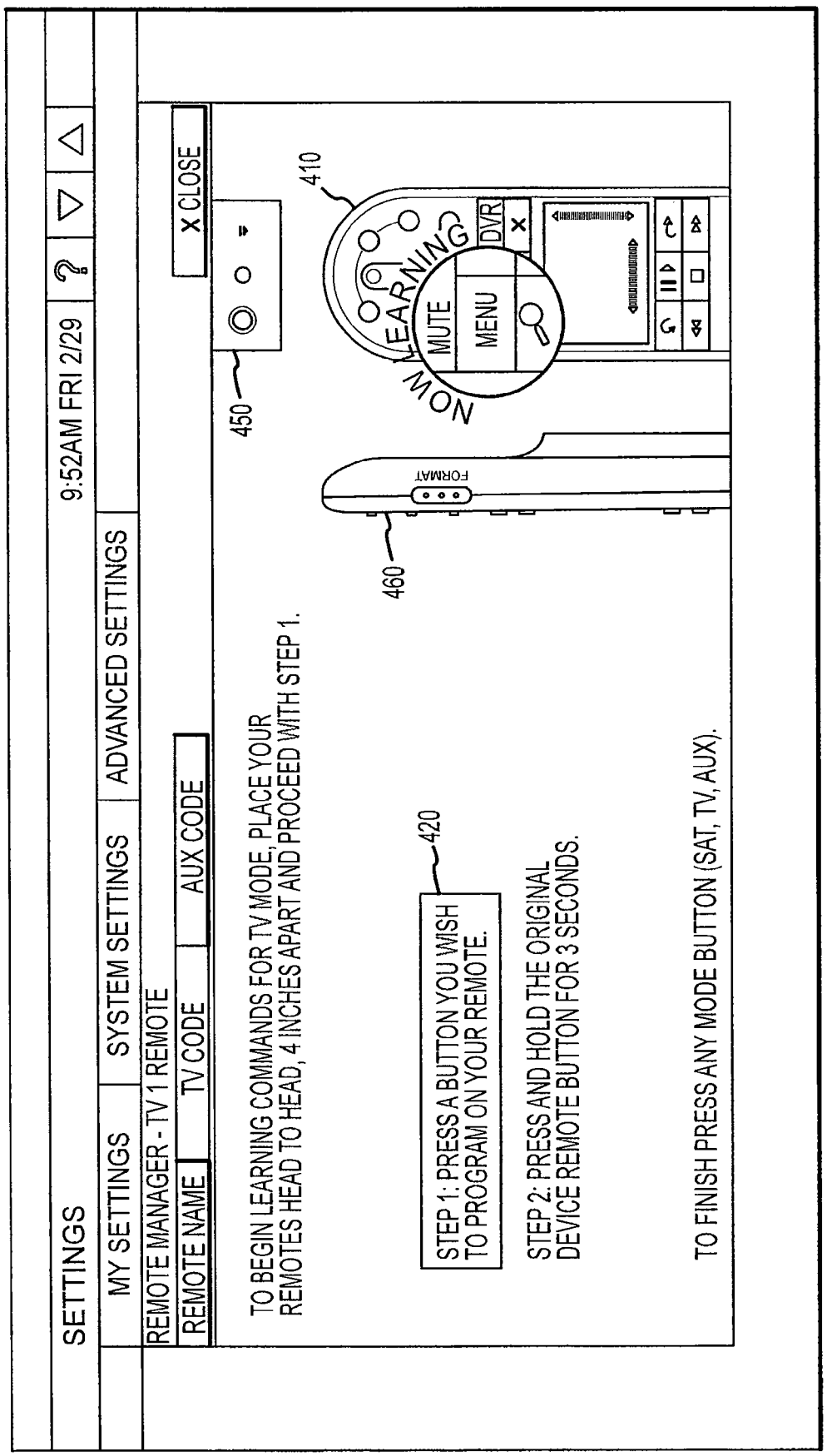
FIG. 4 depicts another example of a graphical programming interface screen.

Moving to a discussion of selecting and programming buttons (or other controls) using the graphical programming interface, FIGS. 4-7 provide one such example sequence of selecting and programming buttons. In one example, the user may wish to program a first remote control by transferring the control commands from a second remote control to the first remote control. When programming, the first remote control may be positioned with respect to the second remote control such that the first remote control may receive control signals from the second remote control. The graphical programming interface may provide the user with first and second remote control images that may illustrate the correct positioning of the remote controls with respect to one another. As shown in FIG. 4, images of the first remote control 410 and the second remote control 450 may illustrate the correct positioning. Additionally, a side view 460 of the first remote control may also be provided to illustrate buttons that may be on the side of the first remote control.

After appropriately positioning the remote controls, the user may select a button on the first remote control for programming. The user may select the physical remote control button for programming by pushing the physical remote control button or by scrolling to a button on the remote control image displayed on the graphical programming interface and selecting the button on the screen. As shown in FIG. 4, a user may be prompted by the graphical programming interface to physically select a button for programming on the first remote control. The prompt and/or current programming step may be text 420, as shown in FIG. 4 as "Step 1." The text 420 may be highlighted on the screen in various ways including surrounding the text with a box, text color, font type, font size and so on. The user may then physically select a button on the physical remote control, such as the "MENU" button for programming. Although the first remote control may be pointed at a second remote control and possibly away from the television receiver, the television receiver may receive the signal from the first remote control that indicates the button selected for programming. In one example, the signal from the first remote control may be a wireless RF signal. The graphical programming interface may then identify, on the screen, the corresponding button image on the remote control image. As shown in FIG. 4, the selected button may be identified on the remote control image by magnifying the text of the button. Although FIG. 4 identifies the selected button on the remote control image with magnified text, any identification method may be used.

Generally, the graphical programming interface may provide a remote control image, which identifies on the screen, the button corresponding to the physical button selected by the user. For example, the user-selected button may be displayed on the screen as shown in FIG. 4 (the button may be magnified), may be highlighted with text color that matches the text color of "Step 1" or the selected button may be indicated on the display by some type of arrow or pointing marker.

In another example, the user may intend to physically select the "MENU" button on the physical remote control, but may mistakenly press another button such as the "SEARCH" button. In this example, the user may be alerted by the graphical programming interface, that the "SEARCH" button was mistakenly selected. The screen may display the "SEARCH" button as the selected button, thus notifying the user that the "MENU" button was not selected as intended. Continuing this example, the user may then select the up arrow button on the graphical programming interface to return to the previous screen and re-select the "MENU" button for programming.

After the user selects the physical button on the first remote control for programming, the user may be prompted to physically select a button on a second remote control to transfer the functionality of the button on the second remote control to the first remote control (i.e., the physical remote control the user wishes to program as previously discussed). The user may select the button on the second remote control (for example, by pushing the button) and the first remote control may receive the control command from the second remote control. Further, the first remote may verify receipt of the command by sending a positive acknowledge signal to the television receiver. The television receiver may receive the positive acknowledge signal and may indicate that the selected button of the first remote control has been successfully programmed. The success and failure of programming buttons will be discussed in further detail below.

Figure 5:
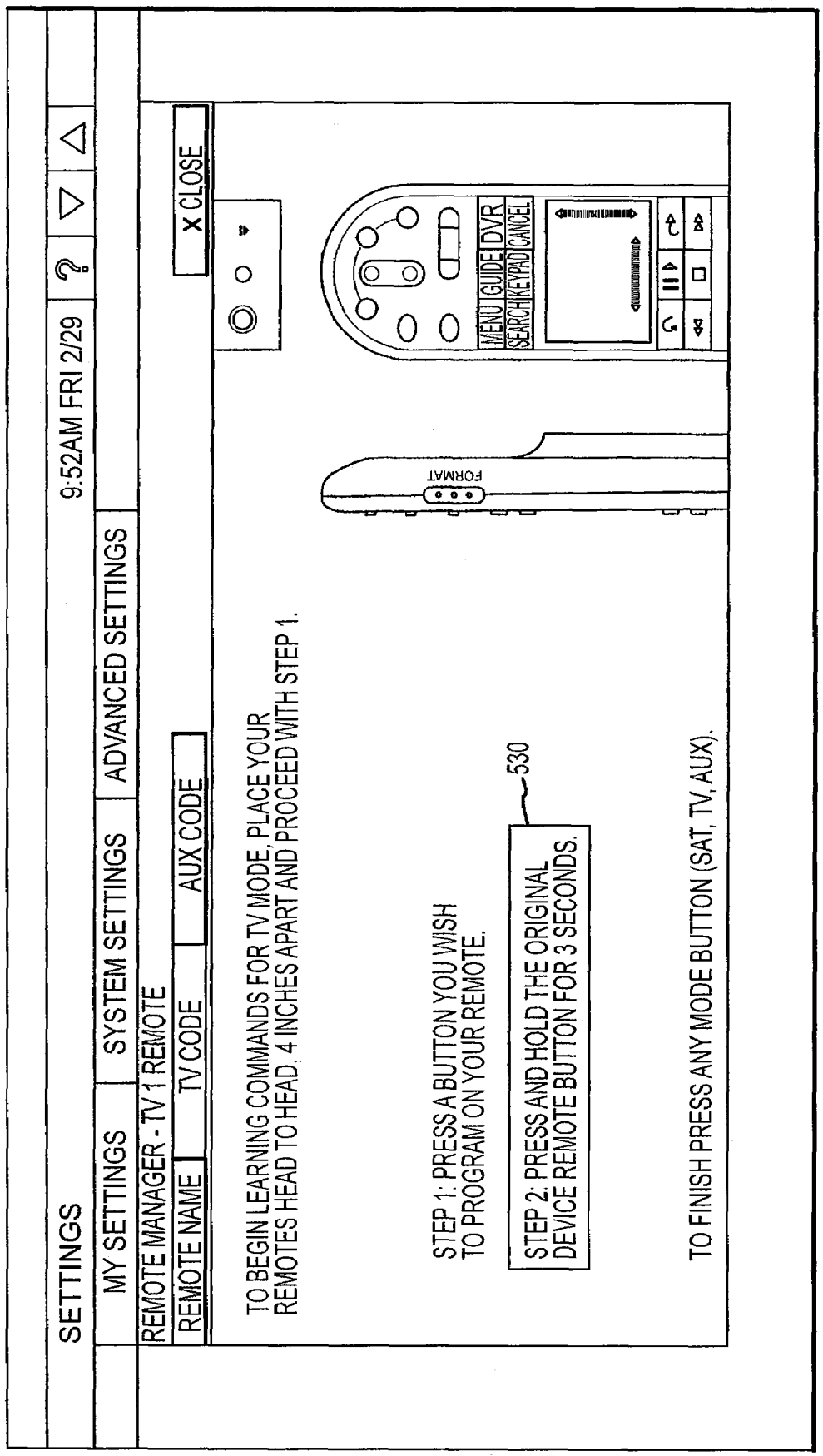
FIG. 5 depicts another example of a graphical programming interface screen.

In the example of FIG. 5, the user may be prompted to select the button on the second remote control with a highlighted prompt. In this example, the prompt is text 530 depicted as "Step 2" in FIG. 5. The text 530 may be highlighted on the screen in various ways, as previously discussed with respect to FIG. 4. The example of FIG. 5 highlights the text 530 with a box surrounding the text.

The graphical programming interface may provide the user with immediate information indicating the success or failure to program the selected remote control button. There may be various reasons for failing to program a remote control button. For example, one or both of the remote controls may not have batteries, the remote controls may be placed too far apart, the remote controls may be positioned incorrectly with respect to one another and so on. Furthermore, the television receiver may indicate a failure of programming the selected button of the first remote for various reasons. For example, the television receiver may not receive the positive acknowledge from the first remote control that indicates the successful receipt of the control command sent by the second remote control and received by the first remote control. In another example, the television receiver may have a configuration setting in TV mode corresponding to a Sharp TV, but may recognize the signal from the second remote control does not correspond to any of the codes corresponding to a Sharp TV.

For example, in FIG. 6, the graphical programming interface indicates that the selected remote control button was not successfully programmed. As shown in FIG. 6, the failed programming attempt may be indicated with text, which may be highlighted in various ways, including a box surrounding the text. Additionally, the unsuccessfully programmed button on the remote control image and the text indicating the failed attempt may be similarly indicated on the graphical programming interface. For example, the text and the button may both be highlighted or colored (not shown). Once the user is notified the physical button has not been programmed, the graphical programming interface may return to the screen shown in FIG. 4. The user may then proceed through the sequence previously discussed with respect to FIGS. 4 and 5.

In yet another example, the user may be swapping the functionality of two or more buttons on a single remote control. The graphical programming interface may only display a single remote control image and in this case, both buttons may be identified on the single remote control image. Alternatively, the graphical programming interface may display two remote control images in which the remote control images are the same remote control.

The television receiver may verify that a button on the first remote control was successfully programmed in various ways. For example and as previously discussed, the television receiver may receive a positive acknowledge from the first remote control, when the first remote control receives a signal from the second remote control and then sends a positive acknowledge signal to the television receiver. In another example, the television receiver may communicate with the first remote control to verify the programmed functionality associated with the selected button of the first remote control and may store the programmed functionality pertaining to the selected button in the television receiver memory. The programmed functionality of the remote control buttons may also be stored on the first remote control itself and may also be backed up in a memory of a second television receiver. Additionally, the television receiver may detect a command from the second remote control to verify that a command was sent from the second remote control to the first remote control.

Turning to FIG. 7, once the selected button is successfully programmed, the graphical interface may indicate the success. In FIG. 7, the text "successfully" may be indicated by a box surrounding the text, text color, type of font, size of font, capital letters and so on. The corresponding successfully programmed button may also be indicated on the graphical programming interface by color. As shown in FIG. 7, the successfully programmed button "MENU" is indicated as such by color (illustrated as shaded in FIG. 7). Additionally, as the remote control buttons are successfully programmed, the programmed buttons may be indicated by the graphical interface with the same color. For example, every successfully programmed button may be indicated as such by shading the displayed programmed buttons on the graphical interface. Because the programmed buttons may be indicated by a color, the user need not remember which buttons have been programmed and which have not.

The user may want to exit the programming mode and may do so in a number of ways. For example, the user may exit in various ways including, but not limited to, selecting the displayed "Close" button, by pressing an appropriate button on the physical remote such as the "satellite" button, the "TV" button and/or the "auxiliary" button. FIG. 8 provides one example of a graphical interface screen once the user has indicated the desire to exit the programming mode. As shown in FIG. 8, the graphical programming interface may verify whether the user wishes to save the programmed buttons before exiting.

One embodiment may allow the programmed functions of a first television receiver remote control to be transmitted to a second television receiver remote control so that all of the corresponding buttons of the first television receiver remote control and the second television receiver remote control perform the same function. In this embodiment, the first television receiver remote control may have existing programmed functionality that may be transferred to a second television receiver remote control. The graphical programming interface may allow a user to view which buttons of the first television receiver remote control have programmed functions and may also provide the functions of each of the first television receiver remote control buttons. For example, the graphical programming interface may display the first television receiver remote control with each of the programmed buttons indicated as green. The graphical programming interface may allow the user to transfer all the programmed functions of the first television receiver remote control to the second television receiver remote control by providing an option that programs all the buttons of the second television receiver remote control to match the buttons of the first television receiver remote control.

Figure 9:
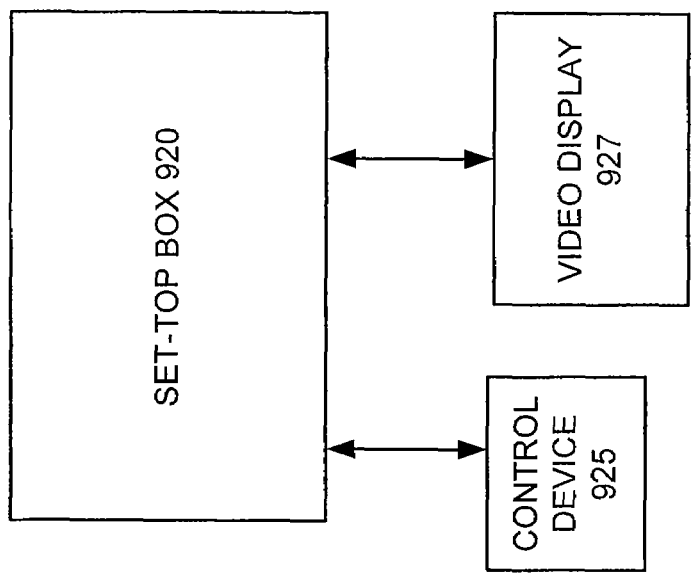
FIG. 9 depicts an example of a system including television receivers, control devices and video displays.
Figure 9:
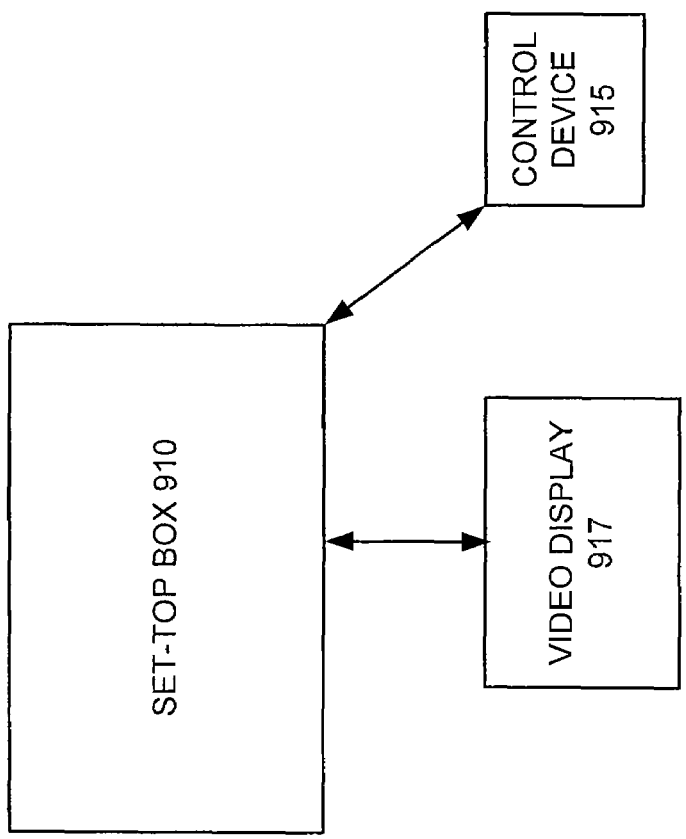

Continuing the description of this embodiment, the programmed functions of the first television receiver remote control may copied on a second television receiver. In FIG. 9, television receiver 910 may be used to program the first television receiver remote control 915. The television 917 may be used to display the graphical programming interface and the television receiver 910 may provide the information for displaying the graphical programming interface to the television 917. In FIG. 9, the programmed functions of the first television receiver remote control 915 may be copied onto television receiver 920 by transmitting the first television receiver remote control 915 programming information to the television receiver 920 from the first television receiver remote control 915 to the television receiver 920. Additionally, the first television receiver remote control 915 programming information may then be transferred to a second television receiver remote control 925 either from the first television receiver remote control 915 or television receiver 920. The second television receiver remote control 925 may be programmed with the functionality of first television receiver remote control 915 as previously described.

Figure 10:
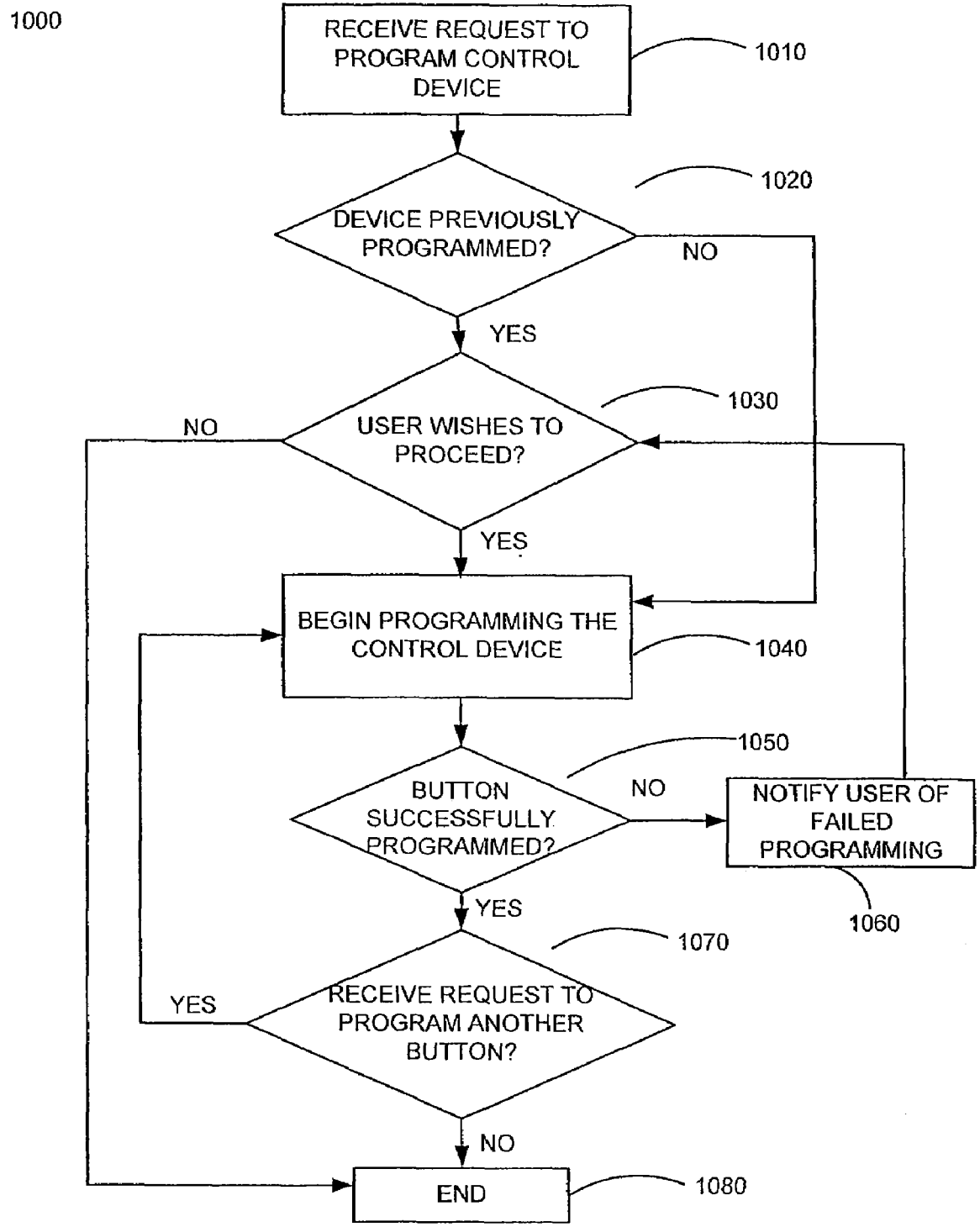
FIG. 10 is a flowchart depicting a sample method for utilizing a graphical programming interface for programming a control device.

FIG. 10 is a flowchart generally describing one embodiment of a method 1000 for programming a control device such as a remote control. In operation 1010, a command to program a control device may be received, and more specifically, the request may be issued by a remote control and may be received by a television receiver. For example, a user may access an electronic display interface provided by the television receiver or may select an appropriate button on a physical remote control to begin programming a remote control. The television receiver may display a graphical programming interface when the command is received. The television receiver may be placed in a programming mode upon receipt of the command and may then send a control command to the remote control, thereby placing the remote control in a programming mode. The graphical programming interface may provide a user with text and images to direct the user through the programming process.

In operation 1020, the television receiver may verify whether the remote control was previously programmed. The television receiver may verify existing remote control programming by communicating with the remote control and accessing the programming functionality associated with the remote control. The television receiver may proceed to operation 1040 if the remote control has not been previously programmed. In the operation 1040, the television receiver may cause a video display such as a television screen, to begin programming the remote control.

Alternatively, the television receiver may proceed to operation 1030 if the remote control has been previously programmed. In operation 1030, the graphical programming interface may verify whether the user wishes to proceed with programming. The user may not wish to program the remote control and proceed to exit the graphical programming interface in operation 1080. If the user wishes to proceed, in the operation 1040, the user may begin programming the remote control via the television receiver. In one example, and as previously discussed with respect to FIGS. 2-8, the user may select a first button from a first remote control and additionally, select a second button from a second remote in order to transfer the functionality of the second button to the first button.

In operation 1050, the television receiver via the graphical programming interface may verify that the first button was successfully programmed. In operation 1060, the graphical programming interface may notify the user that the first button was not successfully programmed. The graphical programming interface may display a pop-up window indicating the button was not successfully programmed, may turn the corresponding button image red, may indicate with text that the programming was not successful and so on. Once the user has been notified of the unsuccessful attempt, the graphical programming interface may verify whether the user wishes to proceed with programming as shown in operation 1030.

If the attempt to program the first button was successful, operation 1070 may verify whether a request to program another button has been received. If not, the method 1000 may proceed to operation 1080 and end. If a request to program another button has been received, the method 1000 may return to operation 1040 and proceed in accordance with the previous discussion.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:
1. A method of programming a remote control comprising:
receiving a control command from the remote control at a television receiver;
operating the television receiver in a programming mode upon receipt of the control command;
outputting a signal from the television receiver that causes a video display device to provide programming information with text and images via a graphical programming interface after receipt of the control command at the television receiver;
receiving an indication at the television receiver from the remote control that identifies a selected button for programming;
outputting a signal from the television receiver that causes the display device to display the selected button on a remote control image via the graphical programming interface;
determining whether the selected button is successfully programmed; and
outputting a signal from the television receiver that causes the display device to indicate on the graphical programming interface whether the selected button is successfully programmed by correlating text that indicates successful programming of a remote control button with an image of the successfully programmed remote control button including displaying both the text and the image of the remote control button as the same color.
2. The method of claim 1 wherein the operation of providing programming information with text and images further comprises allowing the user to view the programmed functionality of each of the remote control buttons.

3. The method of claim 1 wherein the operation of determining whether the selected button is successfully programmed further comprises receiving a positive acknowledge command from the remote control.

4. The method of claim 3 further comprising graphically indicating to the user that the selected remote control button was successfully programmed.

5. The method of claim 1 further comprising storing the programming of each of the remote control buttons on a television receiver.

6. The method of claim 5 further comprising graphically indicating to the user that a remote control button was unsuccessfully programmed.

7. The method of claim 1 further comprising notifying a user that the remote control was previously programmed.

8. The method of claim 1 wherein providing programming information further comprises graphically indicating to the user previously programmed remote control buttons.

9. The method of programming a remote control comprising:
   receiving a control command from the remote control at a television receiver;
   operating the television receiver in a programming mode upon receipt of the control command;
   outputting a signal from the television receiver that causes a video display device to provide programming information with text and images via a graphical programming interface after receipt of the control command at the television receiver;
   receiving an indication at the television receiver from the remote control that identifies a selected button for programming;
   outputting a signal from the television receiver that causes the display device to display the selected button on a remote control image via the graphical programming interface;
   notifying a user that the remote control was previously programmed;
   receiving an indication from the user that the current programming is to be changed;
   overwriting the current programming of the remote control;
   determining whether the selected button is successfully programmed; and
   outputting a signal from the television receiver that causes the display device to indicate on the graphical programming interface whether the selected button is successfully programmed.

10. The method of programming a remote control comprising:
    receiving a control command from the remote control at a television receiver;
    operating the television receiver in a programming mode upon receipt of the control command;
    outputting a signal from the television receiver that causes a video display device to provide programming information with text and images via a graphical programming interface after receipt of the control command at the television receiver;
    receiving an indication at the television receiver from the remote control that identifies a selected button for programming;
    outputting a signal from the television receiver that causes the display device to display the selected button on a remote control image via the graphical programming interface;
    notifying a user that the remote control was previously programmed;
    requesting confirmation from the user before overwriting the current programming of the remote control;
    receiving confirmation from the user to overwrite the current programming of the remote control;
    overwriting the current programming of the remote control;
    determining whether the selected button is successfully programmed; and
    outputting a signal from the television receiver that causes the display device to indicate on the graphical programming interface whether the selected button is successfully programmed.

11. A system for programming a first control device comprising:
    a video display operable to display a graphical programming interface;
    the first control device operable to receive programming functionality to program a control device button and in communication with at least a television receiver, the first control device comprising at least a transmitter operable to transmit commands at least to the television receiver;
    a second control device operable to transmit a control command to at least the first control device
    the television receiver operable to provide display information to the video display for displaying the graphical programming interface and operable to verify the successful programming of a control device button, the television receiver comprising at least a receiver operable to receive commands at least from the first control device, the television receiver further operable to receive a positive acknowledge signal from the first control device indicating that the first control device received the control command from the second control device; and
    the graphical programming interface operable to provide programming information with text and images.

12. The system of claim 11 wherein the graphical programming interface is operable to display the positioning of the first control device with respect to the second control device.

13. The system of claim 11 wherein the graphical programming interface is further operable to graphically indicate that the first control device button was successfully programmed with text and by providing an image of the first control device button.

14. The system of claim 11 wherein the graphical programming interface is further operable to graphically indicate the positioning of the first control device with respect to a second control device when transmitting information between the control devices.

15. The system of claim 11 wherein the television receiver is further operable to cause the graphical programming interface to graphically indicate that the control device was previously programmed.

\* \* \* \* \*

UNITED STATES PATENT AND TRADEMARK OFFICE
CERTIFICATE OF CORRECTION

PATENT NO. : 8,194,191 B2
APPLICATION NO. : 12/371416
DATED : June 5, 2012
INVENTOR(S) : Luke VanDuyn and Neil Marten Page 1 of 1

It is certified that error appears in the above-identified patent and that said Letters Patent is hereby corrected as shown below:

In the Claims:

In Claim 10, Column 13, Line 51 – the first word "The" should be "A"

Signed and Sealed this
Eleventh Day of June, 2013

Teresa Stanek Rea
*Acting Director of the United States Patent and Trademark Office*